United States Patent [19]
Stell

[11] Patent Number: 5,297,434
[45] Date of Patent: Mar. 29, 1994

[54] METHOD OF AND APPARATUS FOR MEASURING WORKPIECES

[76] Inventor: Karl-Wilhelm Stell, Schoppenkamp 3, D-4424 Stadtlohn, Fed. Rep. of Germany

[21] Appl. No.: 823,677

[22] Filed: Jan. 21, 1992

[30] Foreign Application Priority Data

Jan. 22, 1991 [DE] Fed. Rep. of Germany ....... 4101702
Mar. 6, 1991 [DE] Fed. Rep. of Germany ....... 4107077

[51] Int. Cl.$^5$ .................... G01B 21/00; B66F 11/00
[52] U.S. Cl. .................... 73/865.8; 414/226; 414/564; 414/590; 414/669
[58] Field of Search .................... 73/866, 865.9, 865.8; 414/223, 225, 226, 564, 590, 669, 670, 745.8, 744.3, 744.7, 744.8, 783, 785

[56] References Cited

U.S. PATENT DOCUMENTS

| | | | |
|---|---|---|---|
| 2,096,264 | 10/1937 | Schutz | 414/564 |
| 3,255,893 | 6/1966 | Hainer et al. | 414/728 |
| 3,874,525 | 4/1975 | Hassan et al. | 414/225 |
| 4,619,141 | 10/1986 | Yoshieda et al. | 73/865.9 |
| 4,671,122 | 6/1987 | Igarashi | 73/865.9 X |
| 4,852,415 | 8/1989 | Bogatzki et al. | 73/865.8 |
| 4,873,878 | 10/1989 | Milton | 73/865.8 |
| 4,911,597 | 3/1990 | Maydan et al. | 414/225 X |
| 5,046,844 | 9/1991 | Milton | 73/865.8 X |
| 5,214,969 | 6/1993 | Adkins et al. | 73/866 |

Primary Examiner—Tom Noland
Attorney, Agent, or Firm—Darby & Darby

[57] ABSTRACT

Successive workpieces of a series of identical and/or different workpieces are measured at a monitoring station to which the workpieces are delivered by a conveyor serving to advance the workpieces along and/or against one or more orienting devices. A workpiece at the monitoring station is engaged by a clamping device which can enter an axial passage of the workpiece, or can engage a coaxial stud of the workpiece, and is mounted on an elevator which can shift a properly engaged workpiece above or below the transporting level. The workpiece is thereupon monitored by one or more sensors in suspended condition and is returned onto the conveyor. The monitoring operation can involve a single step or a number of steps, for example, to ascertain the condition and/or the shape of the peripheral surface of a cylindrical or polygonal workpiece, to determine the axial length of a workpiece, to determine the inner and/or outer diameter of a workpiece, to determine the inclination of the end faces of a workpiece relative to each other and/or relative to the rotational axis of the workpiece and/or other parameters. The workpiece may but need not rotate and/or move axially in the course of a monitoring operation.

12 Claims, 3 Drawing Sheets

METHOD OF AND APPARATUS FOR MEASURING WORKPIECES

BACKGROUND OF THE INVENTION

The invention relates to improvements in methods of and in apparatus for measuring workpieces, for example, cylindrical workpieces which have axial bores or holes and/or axially extending projections in the form of stubs or the like (hereinafter called stubs).

It is often necessary to machine and/or otherwise finish workpieces with a high, very high or extremely high degree of precision. For example, such precision finished workpieces will be put to use in many types of aircraft, automobiles and/or other categories of vehicles, and at least some of their dimensions must match the desired or optimal dimensions without any or without any presently detectable tolerances. Heretofore known measuring techniques, such as statistical process controlling methods, which have been developed by scientific and industrial establishments are not entirely satisfactory because they are not sufficiently versatile. One of presently known methods involves statistical control of wear upon tools which are subject to gradual wear and are used in many branches of the processing industries. One of the problems which cannot be adequately solved by resorting to presently known techniques is attributable to the continuously increasing utilization of hot- or cold-formed, cast, injection molded, extruded and similarly produced parts. Such mass-producing methods are becoming increasingly popular because they entail considerable savings in material, energy and man hours. On the other hand, extruded, cast, molded or similarly produced parts must be subjected to material removing secondary or finishing treatments if their dimensions are to match the prescribed or desired optimal dimensions. The secondary treatment often involves engagement of successive workpieces by a chuck or the like. The material which is removed from a workpiece, while the workpiece is held by a chuck or a like tool, is often in the form of shavings, dust or other minute particles which float in the air at the material removing station and are likely to penetrate between a workpiece and the chuck to thus affect the accuracy at which a workpiece is being held during removal of material therefrom. A workpiece is further likely to be improperly held by a chuck for any one of several other unforeseen reasons. All this results in the production of a number of defective objects which cannot be readily detected or cannot be detected at all, for example, if the detection of defective or presumably defective objects is dependent on statistical determination of wear upon the material removing tool or tools. The only presently available solution is to monitor each of a short or long series of finished objects or products in a time-consuming operation by resorting to complex and expensive testing equipment. For example, such equipment should be capable of detecting products which are defective due to improper engagement by a chuck because their inner diameter and/or their outer diameter departs from a required value, because their internal surfaces are not concentric with their external surfaces, because the end faces of a solid cylindrical, frustoconical, frustopyramidal, sleeve-like or ring-shaped product are not exactly parallel to each other and/or because the central axes of the products are not exactly normal to their end faces. The just outlined measurements contribute significantly to the cost of such products as well as to the cost of instruments, machines, apparatus and/or other devices in which the products are put to use.

Numerous presently utilized measuring apparatus are designed to carry out statical measurements in accordance with the same principle as manual measurements on measuring tables or measuring stands. Such apparatus employ various work transporting, depositing or positioning and holding or clamping instrumental devices. Particularly the holding or clamping instrumental devices are apt to interfere with the measurements. Reference may be had, for example, to German patent application No. 34 17 741 of Krempel et al. (published Nov. 14, 1985) which discloses a method of and an apparatus for measuring and/or transferring workpieces from a position of readiness to a position for treatment, particularly in a lathe or in a machining center. The measuring unit includes a sensor which can be moved against a workpiece while the workpiece rests on a measuring table. The published patent application of Krempel et al. further proposes to replace the sensor with a clamping or gripping device which is to be used for transfer of workpieces from the positions of readiness to the positions for treatment.

German patent application No. 37 38 165 of Badtke et al. (published May 24, 1989) discloses a work transferring apparatus which employs a lower work carrier and an upper work carrier. The upper work carrier has claws which can engage a workpiece while the latter is supported by the lower work carrier. Once the workpiece is transferred onto the upper work carrier, it is held against rotation relative to the upper carrier. The apparatus of Badtke et al. is not designed to perform measurements upon and/or to facilitate measurement of workpieces on the upper and/or lower carrier.

German Pat. No. 36 13 027 to Weiss (published Sep. 17, 1987) discloses controlled removal and return movement of cylindrical and like workpieces. More particularly, the patent to Weiss discloses a method of fixedly mounting a workpiece in a chuck with assistance from a clamping mandrel. The patentee desires to avoid jamming of the mandrel in the axial bore of the workpiece. To this end, the patentee employs a work clamping device which secures the workpiece to the chuck during extraction of the mandrel. Once the mandrel is extracted, the clamping device is ready to be disengaged from the chuck but not from the workpiece, and the clamping device is thereupon manipulated to separate the workpiece from the chuck.

Presently known measuring apparatus are not suited for dynamic measurement of various parameters of precision finished workpieces, such as the exact contour of a cylindrical peripheral surface, the concentricity or absence of concentricity of the peripheral surface with an internal surface, the inclination of end faces of a ring-shaped, cylindrical or like workpiece relative to each other, the inclination of such end faces relative to the rotational axis of the workpiece and/or the eccentricity or absence of eccentricity of the peripheral surface relative to the axis of rotation. In most instances, dynamic measurement of cylindrical, ring-shaped or like workpieces involves the utilization of mechanical centering devices which must be provided in addition to the work clamping and/or shifting and/or rotating or indexing means. Many conventional measuring apparatus employ turntables with work clamping devices thereon. This interferes with the monitoring of certain parameters of a workpiece on the turntable. Still further, the versatility of presently known measuring apparatus, particularly for dynamic measurement of cylindrical or like workpieces, is unsatisfactory, i.e., it is necessary to design a different measuring apparatus for each of a large number of various workpieces which must be monitored in order to ascertain whether or not their dimensions and/or other parameters match those of an ideal workpiece. The need for a number of specially designed measuring apparatus contributes significantly to the cost of the workpieces and of the machines, apparatus and/or other devices which must employ precision finished parts.

OBJECTS OF THE INVENTION

An object of the invention is to provide a method which renders it possible to measure successive workpieces of a series of workpieces in a time saving manner.

Another object of the invention is to provide a method which can be practiced to carry out measurements upon a wide variety of workpieces.

A further object of the invention is to provide a simple and inexpensive method of measuring workpieces at a high frequency and in a predictable way.

An additional object of the invention is to provide a method which is simpler and less time-consuming than heretofore known methods.

Still another object of the invention is to provide a novel and improved method of manipulating the workpieces prior to, in the course of and subsequent to the measuring step or steps.

A further object of the invention is to provide a novel and improved apparatus for the practice of the above outlined method.

Another object of the invention is to provide the apparatus with novel and improved means for manipulating the workpieces prior to, in the course of and subsequent to the measuring operation or operations.

An additional object of the invention is to provide the apparatus with novel and improved work gripping means.

Another object of the invention is to provide the apparatus with novel and improved work measuring or monitoring means.

Still another object of the invention is to provide measuring or monitoring means which can perform additional important functions.

A further object of the invention is to provide an apparatus which can measure large numbers of workpieces per unit of time, which can measure such workpieces with a higher degree of accuracy than heretofore known apparatus, and which occupies a relatively small amount of space.

An additional object of the invention is to provide the apparatus with novel and improved means for changing the level of workpieces subsequent and/or prior to the measuring operation.

Another object of the invention is to provide an apparatus which can be rapidly converted for the measurement of different types of workpieces.

An additional object of the invention is to provide an apparatus which can be installed in existing production lines and/or machining centers as a superior substitute for heretofore known apparatus.

A further object of the invention is to provide the apparatus with novel and improved work gripping, elevating and turning means.

Another object of the invention is to provide an apparatus which can simultaneously monitor substantial numbers of different parameters of successive workpieces of a short or long series of workpieces.

An additional object of the invention is to provide an apparatus which can reliably segregate all defective or imperfect workpieces from the satisfactory workpieces of a series of successively machined workpieces.

Another object of the invention is to provide an apparatus whose operation is less affected by removed fragments of workpieces and/or by other impurities than the operation of presently known apparatus.

Still another object of the invention is to provide an apparatus which can be utilized with equal advantage for the monitoring of dimensions and/or other characteristics of hollow or solid, polygonal or cylindrical as well as short or elongated workpieces.

An additional object of the invention is to provide an apparatus wherein the device or devices which are used to grip or clamp successive workpieces of a series of workpieces can also perform at least one additional useful function.

SUMMARY OF THE INVENTION

One feature of the present invention resides in the provision of a method of measuring workpieces, such as shafts, cylinders, rings, sleeves and the like. The method comprises the steps of transporting successive workpieces of a series of workpieces in a predetermined direction in a first plane at a first level on to a measuring station, gripping successive workpieces of the series at the measuring station, shifting a gripped workpiece from the first plane into a second plane at a second level (above or below the first level), moving the gripped workpiece to a predetermined angular position with reference to a predetermined axis, monitoring at least one parameter (e.g., the inner diameter, the outer diameter, the axial length, the inclination of the axis of the workpiece relative to an end face and/or the orientation or inclination of two or more surfaces of the workpiece relative to each other), and returning the monitored workpiece into the first plane, e.g., to transport the monitored workpiece in the predetermined direction.

The shifting step can be carried out by an elevator which is turnable about the predetermined axis, and the gripping step can be performed by a clamping device which is carried by the elevator. The moving step can include coupling the gripped workpiece to the elevator and turning the elevator about the predetermined axis.

The method can further comprise the step of regulating the extent of angular movement of the elevator and of the gripped workpiece about the predetermined axis.

The gripping step can comprise moving successive workpieces of the series to a predetermined position relative to the first plane. The clamping device is preferably operative to move a properly gripped workpiece in at least two directions, preferably in at least two directions at right angles to each other. One of these directions is or can be the predetermined direction, and the other of these directions is or can be parallel to the predetermined axis.

The gripping step can be carried out by a clamping device employing one or more toggle levers which are operative to move a workpiece in the at least two directions, preferably at right angles to each other.

If the workpieces are of the type having an axial hole, the gripping step can be carried out by a clamping device which is advanced in the direction of the axis and into the hole of a workpiece at the measuring station. The monitoring step can include ascertaining the extent of advancement of the clamping device in the direction of the predetermined axis.

If the workpieces are of the type having an axial stub, the gripping step is performed by a clamping device which is advanced in the direction of the predetermined axis to engage the stub of a workpiece at the measuring station. The monitoring step can include ascertaining the extent of advancement of the clamping device in the direction of the predetermined axis.

The transporting step can include advancing the series of workpieces by an endless conveyor, e.g., one or more belts and/or chains. The first plane can but need not be a horizontal plane, and the predetermined axis is preferably normal to the first plane.

The method can further comprise the step of orienting successive workpieces of the series of workpieces in the first plane prior to the gripping step.

Another feature of the invention resides in the provision of an apparatus for measuring workpieces, particularly with a high or very high or extremely high degree of accuracy. The improved apparatus comprises means for transporting successive workpieces of a series workpieces in a predetermined direction in a first plane at a first level on to a monitoring or measuring station, means for gripping successive workpieces of the series at the measuring station, an elevator having means for shifting the gripping means with a properly gripped workpiece between the first plane and a second plane at a second level above or below the first level, means for turning the elevator about a predetermined axis which is or can be normal to at least one of the two planes, and means for monitoring at least one parameter of the workpiece which is being gripped by the gripping means while the gripping means is located in the second plane.

In accordance with one presently preferred embodiment, the gripping means includes a mandrel having a sleeve which is engageable with a workpiece at the measuring station, a push- and/or pull rod which is non-rotatably connected with the sleeve, and a cone which is non-rotatably connected with the elevator and is surrounded by the sleeve. The sleeve can be provided with a cylindrical external surface which is receivable in an axial hole of a workpiece at the measuring station. That end of the rod which is remote from the sleeve can cooperate with a measuring means of the monitoring means so that the measuring means can ascertain the extent of movement of the rod relative to the cone. The measuring means is or can be stationary.

Alternatively, the gripping means can comprise at least one dished spring which is coaxial with the elevator and is deformable in response to stressing in the direction of the predetermined axis. The at least one spring is deformable radially of the predetermined axis to engage from within a workpiece which is located at the measuring station and has an axial bore or hole or passage for reception of the gripping means. The at least one spring can form part of the monitoring means, e.g., to facilitate the determination of the diameter of the axial passage of a workpiece by resorting to a device which serves to ascertain the extent of deformation of the at least one spring in response to stressing in the predetermined direction. The just discussed gripping means can comprise two mirror symmetrical packages of dished springs which are receivable in a hole of a workpiece at the measuring station.

The novel features which are considered as characteristic of the invention are set forth in particular in the appended claims. The improved measuring apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
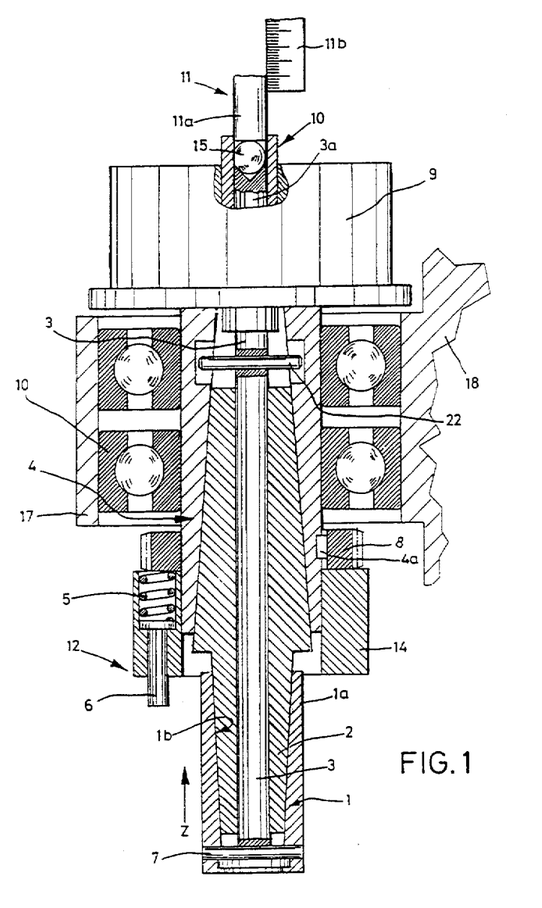
FIG. 1 is a fragmentary partly elevational and partly central vertical sectional view of the elevator and work gripping means in a measuring apparatus which embodies one form of the invention.
Figure 1A:
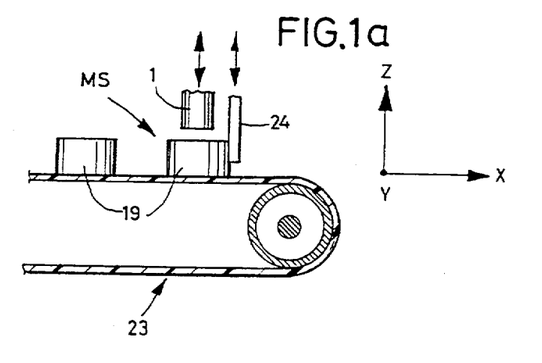
FIG. 1a is a fragmentary schematic elevational view of a conveyor which serves to transport successive workpieces of a series of workpieces to a measuring station for the structure of FIG. 1.
Figure 2:
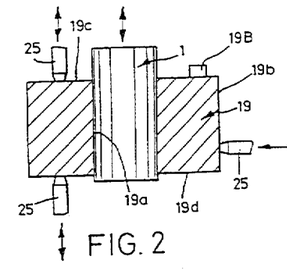
FIG. 2 is an axial sectional view of an annular workpiece which is clamped and centered by gripping means of the type shown in FIG. 1 and is being monitored by several scanners.

Referring first to FIGS. 1, 1a and 2, there is shown an apparatus which embodies one form of the present invention and serves to measure annular workpieces 19 of the type resembling or constituting hollow cylinders, rings or sleeves each having an axial hole, bore or other passage 19a (hereinafter called hole for short). The apparatus comprises an endless belt or chain conveyor 23 (FIG. 1a) or other suitable means for transporting successive workpieces 19 of a series of such workpieces to a measuring or monitoring station MS adjacent the upper reach of the conveyor 23. The latter can transport successive workpieces 19 past or against one or more orienting devices in the form of rails, tracks, stops (24) or the like to ensure that each workpiece 19 which has arrived at the measuring station MS is properly oriented with reference to a gripping or clamping device including a longitudinally slotted sleeve 1, an elongated upright push-pull rod 3 which is coaxial with the sleeve 1, and an elongated slender cone 2 which surrounds the rod 3 and, in turn, is surrounded by the sleeve 1. The sleeve 1 is compelled to share all axial and angular movements of the rod 3 by a first horizontal connecting pin 7, and the cone 2 is compelled to share all angular (but not all axial) movements of the rod 3 by a second horizontal connecting pin 22.

The means for entraining the rod 3 up or down, in order to increase or reduce the outer diameter of the sleeve 1, comprises a fluid-operated (e.g., pneumatic) cylinder and piston unit 9 which serves as a means for tensioning or operating the gripping or clamping device including the parts 1, 2 and 3. The cone 2 includes a downwardly tapering lower portion which extends into the complementary axial bore 1b of the sleeve 1, and an upwardly tapering conical portion which is wedged into a rotary shaft 4 forming part of an elevator. The latter serves to move the gripping or clamping device (hereinafter called clamping device) in and counter to the direction which is indicated by an arrow Z, namely at right angles to the direction (arrow X) of advancement of workpieces 19 with the upper reach of the conveyor 23. FIG. 1a merely shows a single orienting device in the form of a vertically movable stop 24 which is maintained in the lowered position of FIG. 1a when the foremost workpiece 19 of the series of such workpieces approaches the measuring station MS. This ensures that the foremost workpiece 19 is arrested and oriented in proper position for entry of the sleeve 1 into its axial hole 19a.

The elevator further includes a vertically reciprocable shifting member 18 which is connected with the shaft 4 by two stressed antifriction ball bearings 10 in such a way that the shaft 4, the clamping device 1-3 and the fluid-operated entraining means 9 for the rod 3 and sleeve 1 can turn relative to the shifting member 18. The latter can move a workpiece 19, which surrounds and is engaged by the sleeve 1, between a first or lower level (the workpiece then rests on the upper reach of the conveyor 23) and a different second level which, in the embodiment of FIGS. 1, 1a and 2, is located above the first level. However, it is equally within the purview of the invention to design the combination of elevator and clamping device in such a way that the shifting member 18 can move a properly clamped workpiece 19 at the measuring station MS from a first plane (at the level of the upper reach of the conveyor 23) to a second plane at a second level below the first level.

The illustrated shaft 4 is free to turn but cannot move axially relative to the shifting member 18. The sleeve 1 can be moved axially of the cone 2 to thereby increase or reduce the diameter of its external surface 1a and to thus reliably engage the internal surface of a workpiece 19 at the measuring station MS (see FIG. 2). FIG. 1 further shows a monitoring or measuring device 11 which is mounted on the fluid-operated entraining device 9 and serves to ascertain the extent of axial displacement of the sleeve 1 during expansion which is necessary to move the external surface 1a into full or adequate contact with the surface surrounding the hole 19a of the workpiece 19 at the measuring station MS. The illustrated measuring device 11 comprises a vertically movable rod-shaped follower 11a which is adjacent a non-movable scale 11b to ensure that the extent of axial displacement of the rod 3 (and hence the diameter of the hole 19a) can be read off the scale 11b. It is clear that much more sophisticated measuring devices can be used with equal or greater advantage, depending on the desired accuracy of determination of the respective parameter of a workpiece 19 which is being clamped by the device 1-3 and is maintained by the shifting device 18 at a level at least slightly above the upper reach of the conveyor 23. If the rod-shaped follower 11a of the measuring device 11 should not rotate with the rod 3, the device 11 further comprises a spherical insert or distancing element 15 in a cylindrical cage 10 to permit rotation of the rod 3 relative to the follower 11a of the measuring device 11. The cylinder 10 can perform the additional function of acting as a friction bearing for the rod 3. The upper end 3a of this rod (namely the end which is remote from the sleeve 1) is provided with a suitable socket for a portion of the spherical insert 15.

The means for moving the shaft 4 (and hence the clamping device 1-3) about the axis of the rod 3 in order to rotate the workpiece 19 or to index the workpiece at the measuring station MS to one or more preselected angular positions includes a gear 8 which can be rotated by a standard numerically controlled drive (not shown). The gear 8 is keyed to the shaft 4, as at 4a, immediately or closely beneath a housing 17 which forms part of the shifting member 18 and confines the antifriction bearings 10 of the elevator. A second numerically controlled drive (not shown) is used to move the shifting member 18 in or counter to the direction of arrow Z. The two numerical controls ensure that a workpiece 19 which is being gripped by the clamping device 1-3 can be moved to a desired level at the measuring station MS as well as that such workpiece can be moved to any one of a number of desired angular positions preparatory to or during measurement of one or more parameters such as the inclination of the end faces 19c, 19d relative to each other, the inclination of the axis of the rod 3 and sleeve 1 relative to the end face 19c and/or 19d, the inner diameter of the workpiece (i.e., the diameter of the hole 19a), the diameter of the peripheral surface 19b, the distance of the end faces 19c, 19d from one another, the concentricity or lack of concentricity of the peripheral surface 19b with the surface surrounding the hole 19a and/or others.

The aforeenumerated measurements can be carried out while the workpiece 19 at the measuring station MS is stationary or while such workpiece is being rotated about the axis of the rod 3. FIG. 2 shows, by way of example only, three standard sensors 25 which can be moved in the direction of arrow Z, counter to the direction of arrow Z, in the direction of arrow X or counter to the direction of arrow X in order to engage or to move away from the end faces 19c, 19d and the peripheral surface 19b, respectively.

The apparatus can be designed to measure one or more parameters of successive workpieces 19 with a degree of accuracy in the micrometer range. The accuracy of measurements can be enhanced still further if the peripheral surface 1a of the sleeve 1 is finished by a suitable grinding, polishing or other tool while the sleeve is properly clamped in axially stressed condition against the lower portion of the cone 2. The right-hand sensor 25 of FIG. 2 can monitor successive increments of the peripheral surface 19b to ascertain the distance of such increments from the axis of the rod 3 while the workpiece 19 is caused to rotate about the axis. The signals which are generated by the right-hand sensor 25 of FIG. 2 can be transmitted to the memory of an evaluating circuit (e.g., a computer, not shown) which enables the evaluating circuit to display or to otherwise indicate eventual deviations of the finish and/or curvature and/or centricity of the peripheral surface 19b from optimal values. Such highly accurate combined mechanical and electronic measurements can be repeated subsequent to a change of the level of the workpiece 19 at the measuring station MS.

The sensors 25 which are shown in FIG. 2 and/or other suitable sensors can be utilized with equal advantage to cooperate with the numerical controls, with suitable inductive measuring implements and a linearization program of the evaluating circuit (computer) to properly calibrate the clamping device 1-3 prior to carrying out measurements upon successive workpieces 19 of a relatively short or a longer series of such workpieces. In actual practice, one will complete a highly accurate electronic centering or zero setting of the clamping device 1-3 only once, namely prior to start of monitoring of one or more parameters of the first workpiece of a series of identical workpieces. One can also resort to a so-called master to ensure highly accurate centering or zero setting prior to start of the actual monitoring operation.

It is well known that numerous workpieces which are used, for example, in the aircraft and automobile industries must be monitored or measured individually upon completion of precision treatment in order to prevent installation of any defective workpieces in such conveyances. It is often preferred to carry out dynamic measurements of such workpieces in order to ascertain whether or not the end faces 19c, 19d are exactly parallel to each other, whether or not the axis of the workpiece is exactly normal to such end faces, whether or not the peripheral surface 19b is exactly concentric with the surface bounding the hole 19a, whether the one or the other of these surfaces (which should be cylindrical) is out of round and/or whether or not the centers of curvature of the two cylindrical surfaces are located on the axis of the rod 3. The angular movements of the workpiece 19 at the station MS may but need not be programmed with a high degree of accuracy. Accurate programming is not always necessary since the sensors 25 (or analogous sensors) can be utilized to accurately center the clamping device 1-3 before the latter begins to engage workpieces 19 at the station MS. Moreover, the apparatus can be used to measure differently dimensioned and/or shaped workpieces. All that is necessary is to ensure that the clamping device 1-3 can properly engage a workpiece from within and that the sensors 25 are capable of moving into and from engagement with the respective faces and surfaces of a workpiece which surrounds the sleeve 1 at the station MS.

It will be noted that the clamping device 1-3 can perform its basic function of properly engaging the internal surface of a workpiece so that the latter can be lifted off and lowered back onto the conveyor 2, as well as the function of cooperating with the measuring device 11 to ascertain the inner diameter of the workpiece which surrounds and is engaged by the peripheral surface 1a of the sleeve 1. Thus, while the rod 3 is caused to move upwardly (as viewed in FIG. 1) in order to expand the slotted sleeve 1 into requisite frictional engagement with the internal surface of a workpiece 19 or an analogous workpiece, the upper end 3a of the rod 3 lifts the spherical insert 15 and displaces the follower 11a relative to the scale 11b in order to furnish a reading indicating the freshly ascertained inner diameter of the workpiece. Such versatility of the clamping device 1-3 (which serves as a gripper, as a centering means and as a component of the monitoring means) is highly desirable and advantageous because one of the parameters (the inner diameter of a workpiece 19 at the station MS) is or can be determined in automatic response to proper clamping of the workpiece in a manner to ensure that such workpiece will be compelled to share the angular and axial movements of the shaft 4. In all or nearly all presently known measuring apparatus, the determination of inner and outer diameters of a workpiece corresponding to that shown in FIG. 2 must be carried out at two discrete measuring stations with attendant losses in time and output and with higher expenses for monitoring equipment.

Precise machining of the sleeve 1 in axially stressed condition on the cone 2 contributes significantly to accuracy of measurements which can be carried out with the apparatus of FIGS. 1, 1a and 2. As a rule, the measuring range will equal or approximate 10 percent of the clamping range.

Figure 3:
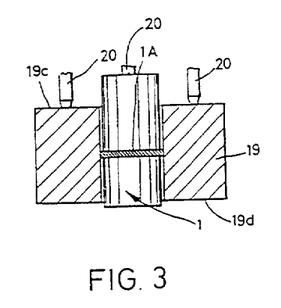
FIG. 3 is a similar axial sectional view of the workpiece of FIG. 2 but showing a different gripping means and three stops which serve to arrest the workpiece in a predetermined plane preparatory to monitoring of one, two or more parameters of the thus located workpiece.

The clamping device which includes the sleeve 1 of FIG. 3 departs from the clamping device of FIGS. 1 and 2 in that the sleeve 1 is surrounded by a centering and clamping ring 1A which comes into actual contact with the internal surface of the workpiece 19. In addition, the apparatus which embodies the structure of FIG. 3 further comprises three stops or locating means 20 which are installed at a predetermined (preferably adjustable) level to determine the second plane, i.e., that plane in which the upper end face 19c of the workpiece 19 is to be located during determination of one or more parameters, such as the outer diameter, the inclination of the end faces 19c, 19d relative to each other and/or others.

The ring 1A can form part of the sleeve 1 or can be separably or permanently affixed thereto.

The axial length of the workpiece which is shown in FIG. 2 can be determined by ascertaining the level of the upper end face 19c and the level of the lower end face 19d, and by thereupon ascertaining the difference between these two levels. Another advantage of the clamping device of FIGS. 1 and 2 is that the inner diameter of the workpiece 19 can be ascertained with a very high degree of accuracy.

FIG. 1 shows that the upper end 3a of the rod 3 extends beyond the gear 8 of the means for moving the clamping device 1-3 about the vertical axis of the rod 3 and that the upper end 3a also extends beyond the shaft 4.

An advantage of the spherical insert 15 is that the follower 11a of the measuring device 11 need not share the angular movements of the rod 3 but is merely required to move (e.g., slide) up or down along the suitably graduated scale 11b. Thus, the measuring device 11 can or must share the movements of the clamping device 1-3 with the shifting member 18 (in or counter to the direction which is indicated by the arrow Z) but such measuring device need not rotate with the shaft 4.

Simultaneous determination of the inner and outer diameters of a workpiece 19 at the measuring station MS constitutes one of the important advantages of the improved method and apparatus. Another important advantage is that the determination of the inner diameter of the workpiece can be carried out with a very high degree of accuracy, namely a degree which is not achievable by resorting to heretofore known measuring apparatus except perhaps in laboratories with an equipment which is not suitable for the measurement of a long or very long series of workpieces at a high frequency such as is expected in connection with the making and finishing of parts which are to be used in the aircraft, automobile and similar industries. The reason is that the cone 2 defines an inclined plane which causes the sleeve 1 to expand into engagement with the internal surface of a workpiece 19 or to expand its ring 1A into requisite engagement with the internal surface of a workpiece. The measurements which are carried out with monitoring means including the clamping device 1-3 are highly reproducible and, as already stated above, are at least as accurate as those which can be carried out in laboratories but not in an existing production line or machining center. A further important advantage of the just discussed determination of the inner diameter of a workpiece 19 with the clamping device 1-3 is that the clamping device 1-3 is simple, subject to minimal wear and relatively inexpensive. Absence of pronounced wear ensures that the accuracy of measurements remains unchanged for long intervals of time, even if the measurements are carried out at a high frequency.

Figure 4:
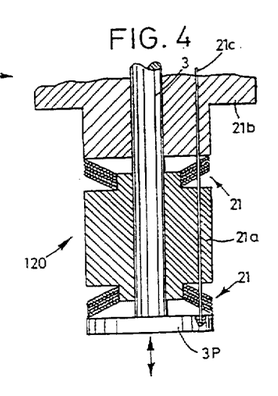
FIG. 4 is an axial sectional view of a further clamping device prior to deformation of its two sets of dished springs into engagement with the internal surface of an annular workpiece.
Figure 5:
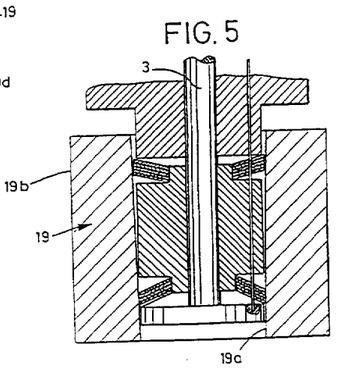
FIG. 5 shows the structure of FIG. 4 but with the dished springs in deformed condition to properly clamp and center an annular workpiece.

FIGS. 4 and 5 show a modified clamping device 120 which includes two sets of dished springs 21, a cylindrical carrier 21a for the two sets of springs, a rod 3 with a platform 3P, a stop 21b and a pin 21c which prevents rotation of the carrier 21a, springs 21, platform 3P and stop 21b relative to each other. The stop 21b is secured to the shaft 4 (not shown in FIGS. 4-5), and the rod 3 is movable up and down by the cylinder and piston unit 9 (not shown in FIGS. 4-5). The two sets of dished springs 21 are or can be mirror images of each other.

When the springs 21 are free to push the platform 3P away from the stop 21b to the axial position of FIG. 4, the clamping device 120 can readily be introduced into the hole 19a of a workpiece 19. The unit 9 is thereupon actuated to move the platform 3P toward the stop 21b whereby the springs 21 are deformed in the axial direction of the rod 3 as well as radially outwardly so that they engage, clamp and center a workpiece in a manner as shown in FIG. 5. The extent of axial movement of the rod 3 and its platform 3P can be ascertained to thus determine the inner diameter of the workpiece 19, e.g., in a manner as described with reference to FIG. 1. In addition, the workpiece 19 is properly centered and held for one or more additional monitoring operations, e.g., with sensors 25 of the type described in connection with FIG. 2. The springs 21 can be said to act not unlike knuckle joints or toggle levers. The radially outermost portions of the springs 21 can be ground and/or otherwise precision finished preparatory to engagement with a workpiece 19. Such treatment can be monitored to ensure that the freshly polished and/or otherwise precision treated springs 21 can engage successive workpiece 19 with a requisite degree of accuracy and reproducibility. When properly stressed to undergo requisite deformation in the radial and axial directions of the rod 3, the springs 21 can reliably clamp a workpiece 19 from within during static and/or dynamic determination of one or more parameters of such workpiece. In fact, it has been found that, at least under certain circumstances (e.g., in connection with the measurement of certain types of workpieces), the action of the clamping device 120 is even more satisfactory (as far as the accuracy and reproducibility of the clamping and measuring actions is concerned) than the action of a clamping device of the type shown in FIGS. 1-2, in FIG. 3 or in FIG. 6. Furthermore, the configuration of the dished springs 21 can be readily selected in such a way that these springs can properly clamp and center workpieces which are provided with non-circular bores or holes and/or which have holes, bores or other passages having a cross-sectional area that varies from one end toward the other end. Still further, the two sets of dished springs 21 can properly center and clamp workpieces wherein the radially outermost portions of the springs can engage only small or minute portions of the internal surface or a very small or minute internal surface.

The one or the other set of dished springs 21 can be inverted without departing from the spirit of the invention. For example, the upper set of springs 21 can be inverted so that each of these springs diverges radially outwardly and downwardly, the same as the dished springs 21 of the lower set. This would entail an axial movement of the workpiece 19 in response to movement of the platform 3P nearer to the stop 21a. In such instance, the thus modified clamping device 120 can be caused to operate with one or more stops 20 to determine the level of the plane in which a workpiece is to be located in the course of a monitoring operation. Thus, the mode of operation of the just described modified clamping device 120 more closely resembles that of the clamping device 1-3 of FIGS. 1-2, of the clamping device of FIG. 3 or of the clamping device of FIG. 6.

Each of the heretofore described clamping devices exhibits the additional advantage that the central vertical axis of the rod 3 coincides with the central vertical axis of a properly clamped workpiece 19. This simplifies the design and mode of operation of the moving means including the gear 8 of FIG. 1, i.e., of the means for moving (indexing or rotating) a properly clamped workpiece 19 about a predetermined axis, e.g., in order to ascertain whether or not the peripheral surface 19b of the workpiece is out of round.

FIG. 1 shows that the shaft 4 (and hence the gear 8) is non-rotatably connected with an indexing mechanism 12 including a ring 14 which can be used to move a workpiece 19 to a predetermined angular position relative to the sleeve 1 before the sleeve is caused to expand radially outwardly and to engage the surface surrounding the hole 19a of such workpiece. To this end, the workpiece 19 will be provided with a projection 19B (see FIG. 2) which extends beyond the upper end face 19c and can be engaged by a downwardly extending entraining post or stud 6 which projects beyond the underside of the indexing ring 14 and is biased to its lower end position (shown in FIG. 1) by a coil spring 5 reacting against the underside of the gear 8. When a workpiece 19 on the upper reach of the conveyor 23 of FIG. 1a engages the stop 24 of the orienting means, the shifting member 18 lowers the clamping device 1-3 while the sleeve 1 is still in unexpanded lower end of the post 6 strikes the upper axial hole 19a of the workpiece abutting the stop 24. The exposed lower end of the post 6 strikes the upper end face 19c of the workpiece 19 on the conveyor 23 at the measuring station MS, and the post 6 is depressed into the ring 14 against the opposition of the spring 5. The numerical controls for the gear 8 are thereupon caused to turn the shaft 4 and the ring 14 so that the partly depressed post 6 slides along the upper end face 19c and engages the projection 19B of the workpiece 19 on the conveyor 23 at the station MS. This enables the gear 8 to index the workpiece 19 to a predetermined starting angular position before the cylinder and piston unit 9 is caused to lift the rod 3 and to thus expand the sleeve 1 into requisite clamping and centering engagement with the internal surface of the workpiece. The numerical controls for the gear 8 and ring 14 are thereupon actuated to index the workpiece 19 on the sleeve 1 to any one of any desired number of different angular positions, e.g., to positions at 90° or 180° relative to each other.

The spring 5 can be omitted, i.e., the post 6 can be caused to assume the illustrated lower end position under the action of gravity. Furthermore, this stud can be replaced with a pivotable pallet or with any other suitable torque transmitting means. All that counts is to ensure that the stud 6 or an equivalent of this stud can engage the projection 19B of a workpiece 19 or an equivalent portion of the workpiece at the station MS in order to enable the gear 8 to change the angular position of the workpiece before the latter is clamped by the sleeve 1. The workpiece is then ready to be indexed or rotated about the axis of the rod 3, e.g., through an angle of 360° if the measurement involves the monitoring of a single parameter such as the finish and/or shape of the external surface 19b. The projection 19B can be replaced with a recess or socket (e.g., a blind bore or hole (not shown) in the upper end face 19c) which is dimensioned to receive a portion of the stud 6, either in immediate response to lowering of the ring 14 toward a workpiece 19 on the conveyor 23 at the measuring station MS or subsequent to a certain angular displacement of the ring 14 relative to such workpiece so that the stub 6 is caused to register with and to enter the recess or socket before the rod 3 is moved axially to expand the sleeve 1. The arrangement may be such that the ring 14 is rotated in a first direction in order to engage the stud 6 with the projection 19B or to cause this stud to enter a recess or socket in the adjacent end face 19c, and that the ring 14 is thereupon rotated in a second direction counter to the first direction in order to rotate the workpiece or to index the workpiece to one or more selected angular positions, e.g., to a zero position in which the workpiece is ready to be clamped by the sleeve 1. Once the workpiece is clamped so that it can be moved to a desired level above the conveyor 23, the workpiece can be indexed to one or more selected angular positions in order to ensure proper scanning by the right-hand sensor 25 of FIG. 2. Such scanning might be desirable or necessary if the workpiece is not a cylinder but has an oval, a polygonal or another non-circular outline which must be monitored before the workpiece is released for use in a conveyance such as an aircraft or a motor vehicle By way of example, the apparatus of FIGS. 1, 1a and 2 can be utilized to measure an annular workpiece 19 (which may but need not have a cylindrical peripheral surface) in the following way:

The foremost workpiece 19 of a series of such workpieces on the upper reach of the conveyor 23 of FIG. 1a is advanced in the direction of arrow X so that it ultimately reaches and is arrested by the orienting means including the stop 24. On its way toward the stop 24, the foremost workpiece 19 can be caused to engage one or more additional orienting members, e.g., one or more rails, ramps or like parts. The orienting means ensures that the foremost workpiece 19 of the series of such workpieces reaches the measuring station MS in an optimum position for engagement by the stub 6 and thereafter by the sleeve 1 or immediately by the sleeve 1. The first step involves lowering of the clamping device 1–3 by the shifting member 18 (i.e., in response to an appropriate signal from the numerical controls for the member 18) so that the (unexpanded) sleeve 1 can readily enter the axial hole 19a of the workpiece 19 at the station MS. If necessary, expansion of the sleeve 1 into engagement with the internal surface of the workpiece 19 is preceded by a change of angular position of the workpiece by means of the stud 6 in a manner as described above to thus ensure that the workpiece assumes a predetermined angular position relative to the clamping device 1–3 before the sleeve 1 is caused to expand.

The next step involves actuation of the clamping device 1–3, i.e., the unit 9 causes the rod 3 to move upwardly (arrow Z) and to thus expand the sleeve 1 which must slide along the slender lower portion of the cone 2. This ensures that the workpiece 19 is properly engaged as well as centered by the sleeve 1 so that the vertical axis of the workpiece coincides with the central vertical axis of the rod 3, i.e., with the axis of rotation of the gear 8 and shaft 4. The shifting member 18 is thereupon caused to lift the clamping device 1–3 and the workpiece 19 to a desired level above the upper reach of the conveyor 2 so that the workpiece is not supported from below while it undergoes one or more measurements in addition to that measurement (of the diameter of the hole 19a) which is carried out by the clamping device 1–3 and measuring device 11 in automatic response to radial expansion of the sleeve 1 into engagement with the internal surface of the workpiece. As already explained above, the diameter of the surface surrounding the hole 19a is ascertained in automatic response to proper clamping of the workpiece 19 by the device including the sleeve 1, cone 2 and rod 3 because this involves a certain upward movement of the follower 11a along the scale 11b of the measuring device 11.

The next-following step can involve static measuring or monitoring of the lifted workpiece 19 by one or more sensors, e.g., by the sensors 25 which are shown in FIG. 2. Alternatively, or in addition to such static measurement or measurements, the numerical controls for the gear 8 can be caused to transmit one or more signals in order to index the lifted workpiece 19 through one or more angles of, for example, 90°, 180°, or 270° and/or through one or more other angles in order to carry out a dynamic measurement of one or more parameters, e.g., to monitor the finish and/or the curvature of the peripheral surface 19b by the right-hand sensor 25 of FIG. 2. Dynamic measurements can be carried out while the work-piece 19 is maintained in continuous rotary motion about the axis of the rod 3. If the peripheral surface 19b is a conical or partly spherical surface, the monitoring can involve the utilization of a single sensor (such as the right-hand sensor 25 of FIG. 2 which is then movable in and counter to the direction of arrow X as well as in and counter to the direction of arrow Z) or the utilization of two or more sensors which are located at different levels and are movable at least in and counter to the direction of arrow X.

Measurements with the three sensors 25 of FIG. 2 can be carried out in order to ascertain the distance of the end faces 19c, 19d relative to each other, whether or not these end faces are parallel to each other, whether or not at least one of these end faces is normal to the axis of the rod 3 (i.e., to the axis of the workpiece 19), whether the center of curvature of each increment of the peripheral surface 19b is located on the axis of the rod 3 and/or whether the surface 19b is concentric with the surface bounding the hole 19a.

The next step can include lowering of the measured workpiece 19 onto the conveyor 2 and contraction of the sleeve 1 so that the clamping device 1–3 can be lifted relative to the thus released workpiece and the latter can be transported away from the measuring station MS, e.g., by the conveyor 23, by a pusher which moves the freshly monitored or measured and released workpiece off the conveyor 23 or in any other suitable way. Successively measured workpieces can be advanced to a classifying station, to storage, to a further treating station or to another destination.

Figure 6:
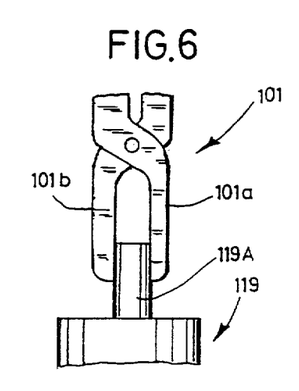
FIG. 6 shows a modified workpiece which is provided with a coaxial stud, and gripping means in the form of tongs which can engage and center the stud.

FIG. 6 shows a workpiece 119 which can constitute a solid cylinder of metallic or plastic material and has a coaxial stud 119A. The latter is engaged by a clamping device 101 in the form of tongs having at least two jaws 101a, 101b at least one of which is movable relative to the other jaw or jaws to engage or release the stud 119A. The extent of pivoting of one or more jaws into proper engagement with the stud 119A can be ascertained by a measuring device (analogous to the device 11 of FIG. 1) in order to ascertain the diameter of the stud. The clamping device 101 is movable up and down and is rotatable in a manner analogous to corresponding movements of the clamping device 1-3 of FIG. 1 in order to permit static and/or dynamic measuring of the workpiece 119 while the latter is lifted off or lowered below a conveyor, not shown in FIG. 6.

The term "stud" is also intended to embrace an end portion of a workpiece, i.e., the diameter of the stud need not always be smaller than the diameter of the remaining part or parts of the workpiece.

The tongs 101 of FIG. 6 can be replaced by any other suitable clamping device which can properly engage and center the workpiece 119 or an analogous workpiece having one or more studs 119a. For example, the tongs can be replaced with a chuck (such as a universal chuck or a collet chuck) which can be actuated by the unit 9 or by other suitable actuating means in order to engage a stud 119A and to thus center the respective workpiece 119 preparatory to lifting or lowering of a transporting conveyor.

Irrespective of the exact nature of its clamping device, the apparatus of the present invention exhibits the important advantage that a workpiece which has been lifted above or lowered below the conveyor 2 or other suitable transporting means is much more readily accessible for accurate measurement of its dimensions and/or other parameters than in heretofore known apparatus. Such conventional apparatus normally employ a stationary table, a measuring stand, a turntable or other parts which support the workpieces from below so that at least the underside of a thus supported workpiece is not readily accessible. The clamping or holding devices which are used in conjunction with a table, stand or an analogous support are also likely to interfere with access to certain parts of the clamped workpieces.

On the other hand, the improved method and apparatus render it possible to maintain a workpiece to be monitored in suspended condition so that the workpiece is more readily accessible for all kinds of measurements. Moreover, a workpiece which is engaged by the clamping device of the improved apparatus can be raised or lowered to any one of a desired number of levels (such as by the numerical controls for the shifting member 18 of FIG. 1) in order to further simplify the measurement or measurements and/or to permit measurements which cannot be carried out by resorting to heretofore known apparatus. In other words, a workpiece which is already properly held by the clamping device of the improved apparatus can be moved to any one of a number of preselected levels, or the level or levels at which the measurements are to take place will be determined in the course of a particular measurement or in the course of two or more different measurements. This might become necessary if the dimensions of a workpiece vary in the direction of its axis and/or in other directions. For example, the conicity of a peripheral surface can be ascertained by moving the workpiece axially (up or down) while the workpiece rotates about its vertical axis. Furthermore, it might be necessary to move a properly clamped workpiece to a given level in order to permit the monitoring of a particular parameter, for example, if the workpiece is small or very small and the height of the portion to be monitored in extremely small (e.g., in the range of less than 1 mm). Automatic determination of an optimal level in order to carry out a satisfactory measuring operation is or can be of utmost importance.

It is further within the purview of the invention to use the elevator and the clamping device of the improved apparatus as a means for moving a properly clamped workpiece against one or more stationary sensors (such as the topmost sensor 25 in FIG. 2). Thus, it is not always necessary to employ mobile sensors or other types of mobile measuring devices because the improved apparatus can be used to move a properly clamped workpiece against one or more fixedly mounted sensors or the like. All this contributes to versatility of the improved method and apparatus. A mobile sensor can be installed for movement only in or counter to the direction of arrow X and/or for movement only in or counter to the direction of arrow Z and/or for movement only in a direction at right angles to those indicated by the arrows X and Z.

A clamping device which cooperates with stops of the type shown at 20 in FIG. 3 can be used with particular advantage when it is desirable or necessary to "support" the workpiece from above rather than from below (as in conventional apparatus which employ stationary tables, supporting stands and/or turntables). Thus, the tips of the stops 20 determine a reference plane which coincides with the upper end face 19c of the workpiece 19 shown in FIG. 3 so that the entire underside of the workpiece is accessible, e.g., to a sensor of the type corresponding to the lowermost sensor 25 of FIG. 2. At the same time, the stops 20 maintain the upper end face 19c of such workpiece at a predetermined level so that the axial length of the workpiece can be ascertained in a particularly simple and inexpensive manner.

The conveyor 2 or another suitable transporting system can be used to deliver a series of identical workpieces or to simultaneously deliver randomly or otherwise distributed differently dimensioned and/or shaped workpieces. The orienting means can be designed in such a way that its part or parts will properly position an oncoming workpiece for engagement by the clamping device regardless of the exact size and/or shape of the oncoming workpiece. Such universal orienting means are known, and the selected orienting means can be designed to properly orient an oncoming workpiece in a plane (the X-Y plane) which includes the upper reach of the conveyor 23 of FIG. 1a. Such plane may but need not be a horizontal plane.

The orienting means constitutes a desirable but optional feature of the improved apparatus. Thus, such orienting means can be dispensed with or deactivated if a highly accurate orientation of workpieces on the transporting means is not necessary, e.g., if such accurate orientation becomes necessary only in the course of an actual monitoring or measuring operation.

As already mentioned above, the improved apparatus can be modified in a number of ways without departing from the spirit of the invention. For example, the clamping means and the elevator of the improved apparatus can be designed to lower an oncoming workpiece from a higher level (of the transporting means) to a lower level. The illustrated mode of raising an oncoming workpiece above the transporting means preparatory to one or more monitoring or measuring steps is preferred in many instances, for example, because the transporting means for delivery of workpieces to the measuring station MS can employ one or more simple and inexpensive belt conveyors, chain conveyors or other readily available endless conveyor means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of measuring workpieces, comprising the steps of transporting successive workpieces of a series of workpieces in a first plane at a first level in a predetermined direction to a measuring station; gripping successive workpieces of the series at the measuring station; shifting a gripped workpiece from the first plane into a second plane at a second level at which the gripped workpiece is movable to a predetermined angular position with reference to a predetermined axis; monitoring at least one parameter of the thus gripped and shifted workpiece; and returning the monitored workpiece into the first plane, said shifting step being carried out by an elevator which is turnable about said axis and said gripping step is performed by a clamping device which is carried by the elevator, further comprising the steps of coupling the gripped workpiece to the elevator and turning the elevator about said axis.

2. The method of claim 1, further comprising the step of regulating the extent of angular movement of the elevator and of the gripped workpiece about said axis.

3. The method of claim 1, wherein said gripping step comprises moving successive workpieces of the series to a predetermined position relative to said first plane.

4. The method of claim 1, wherein said gripping step is performed by a clamping device which is operative to move a workpiece in at least two directions at right angles to each other.

5. The method of claim 4, wherein one of said at least two directions is said predetermined direction and another of said at least two directions is parallel to said axis.

6. The method of claim 1, wherein said gripping step is performed by at least one toggle lever Which is operative to move a workpiece in at least two directions at right angles to each other.

7. The method of claim 6, wherein one of said at least two directions is said predetermined direction and another of said at least two directions is parallel to said axis.

8. The method of claim 1 of measuring workpieces of a type having an axial hole, wherein said gripping step is performed by a clamping device which is advanced in the direction of said axis into the hole of a workpiece at said station, said monitoring step including ascertaining the extent of advancement of the clamping device in the direction of said axis.

9. The method of claim 1 of measuring workpieces of a type having an axial stub, wherein said gripping step is performed by a clamping device which is advanced in the direction of said axis to engage the stub of a workpiece at said station, said monitoring step including ascertaining the extent of advancement of the clamping device in the direction of said axis.

10. The method of claim 1, wherein said transporting step includes advancing the series of workpieces by an endless conveyor.

11. The method of claim 1, further comprising the step of orienting successive workpieces of the series in the first plane prior to said gripping step.

12. The method of claim 1, wherein said shifting step comprises lifting the gripped workpiece above said first plane to a suspended position, said monitoring step being carried out while the gripped and shifted workpiece is maintained in suspended position.

* * * * *

UNITED STATES PATENT AND TRADEMARK OFFICE
CERTIFICATE OF CORRECTION

PATENT NO. : 5,297,434
DATED      : March 29, 1994
INVENTOR(S): Karl-Wilhelm Stell It is certified that error appears in the above-indentified patent and that said Letters Patent is hereby corrected as shown below:

The title page, should be deleted to be replaced with the attached title page.

The drawing sheets, consisting of Figs. 1-6, should be added as shown on the attached pages.

Signed and Sealed this

Twenty-third Day of August, 1994

Attest:

BRUCE LEHMAN

Attesting Officer

Commissioner of Patents and Trademarks

United States Patent [19]
Stell

[11] Patent Number: 5,297,434
[45] Date of Patent: Mar. 29, 1994

[54] METHOD OF AND APPARATUS FOR MEASURING WORKPIECES

[76] Inventor: Karl-Wilhelm Stell, Schoppenkamp 3, D-4424 Stadtlohn, Fed. Rep. of Germany

[21] Appl. No.: 823,677

[22] Filed: Jan. 21, 1992

[30] Foreign Application Priority Data

Jan. 22, 1991 [DE] Fed. Rep. of Germany ...... 4101702
Mar. 6, 1991 [DE] Fed. Rep. of Germany ...... 4107077

[51] Int. Cl.$^5$ .................... G01B 21/00; B66F 11/00
[52] U.S. Cl. ............................ 73/865.8; 414/226; 414/564; 414/590; 414/669
[58] Field of Search .................. 73/866, 865.9, 865.8; 414/223, 225, 226, 564, 590, 669, 670, 745.8, 744.3, 744.7, 744.8, 783, 785

[56] References Cited

U.S. PATENT DOCUMENTS

| | | |
|---|---|---|
| 2,096,264 | 10/1937 | Schutz .................... 414/564 |
| 3,255,893 | 6/1966 | Hainer et al. ............ 414/728 |
| 3,874,525 | 4/1975 | Hassan et al. ........... 414/225 |
| 4,619,141 | 10/1986 | Yoshieda et al. ......... 73/865.9 |
| 4,671,122 | 6/1987 | Igarashi ................. 73/865.9 X |
| 4,852,415 | 8/1989 | Bogatzki et al. ......... 73/865.8 |
| 4,873,878 | 10/1989 | Milton .................. 73/865.8 |
| 4,911,597 | 3/1990 | Maydan et al. .......... 414/225 X |
| 5,046,844 | 9/1991 | Milton .................. 73/865.8 X |
| 5,214,969 | 6/1993 | Adkins et al. ........... 73/866 |

Primary Examiner—Tom Noland
Attorney, Agent, or Firm—Darby & Darby

[57] ABSTRACT

Successive workpieces of a series of identical and/or different workpieces are measured at a monitoring station to which the workpieces are delivered by a conveyor serving to advance the workpieces along and/or against one or more orienting devices. A workpiece at the monitoring station is engaged by a clamping device which can enter an axial passage of the workpiece, or can engage a coaxial stud of the workpiece, and is mounted on an elevator which can shift a properly engaged workpiece above or below the transporting level. The workpiece is thereupon monitored by one or more sensors in suspended condition and is returned onto the conveyor. The monitoring operation can involve a single step or a number of steps, for example, to ascertain the condition and/or the shape of the peripheral surface of a cylindrical or polygonal workpiece, to determine the axial length of a workpiece, to determine the inner and/or outer diameter of a workpiece, to determine the inclination of the end faces of a workpiece relative to each other and/or relative to the rotational axis of the workpiece and/or other parameters. The workpiece may but need not rotate and/or move axially in the course of a monitoring operation.

12 Claims, 3 Drawing Sheets